US005526644A

United States Patent [19]

Brieschke

[11] Patent Number: 5,526,644

[45] Date of Patent: Jun. 18, 1996

[54] OIL INTENSIFIER CYLINDER

[76] Inventor: Todd M. Brieschke, 7461 Tarra, Temperance, Mich. 48182

[21] Appl. No.: 478,099

[22] Filed: Jun. 7, 1995

[51] Int. Cl.[6] ..... B60T 17/00

[52] U.S. Cl. ..... 60/565.000; 60/567.000; 60/581.000

[58] Field of Search ..... 60/560, 565, 567, 60/581; 92/52

[56] References Cited

U.S. PATENT DOCUMENTS

| | | | |
|---|---|---|---|
| 763,833 | 6/1904 | Albree . | |
| 1,007,349 | 10/1911 | Gerdau . | |
| 2,032,185 | 2/1936 | Sciaky . | |
| 2,827,766 | 3/1958 | Hufford . | |
| 2,915,878 | 12/1959 | Hramoff | 60/565 X |
| 3,426,530 | 2/1969 | Georgelin . | |
| 3,488,957 | 1/1970 | Snitgen . | |
| 3,511,048 | 5/1970 | Nemetz . | |
| 3,732,691 | 5/1973 | Muller | 60/51 |
| 3,835,649 | 9/1974 | Le Testu | 60/560 |
| 3,875,365 | 4/1975 | Beneteau | 219/89 |
| 3,898,805 | 8/1975 | Good, Jr. | 60/325 |
| 3,942,323 | 3/1976 | Maillet | 60/413 |
| 4,030,299 | 6/1977 | Reuschel | 60/560 |
| 4,072,013 | 2/1978 | Barbareschi | 60/565 X |
| 4,096,855 | 6/1978 | Fleury, Jr. | 128/2.08 |
| 4,099,436 | 7/1978 | Beneteau | 83/617 |
| 4,149,384 | 4/1979 | Marshall | 60/542 |
| 4,271,671 | 6/1981 | Smeets | 60/578 |
| 4,288,987 | 9/1981 | Grüllmeier | 60/560 |
| 4,300,351 | 11/1981 | Grüllmeier | 60/560 |
| 4,328,671 | 5/1982 | Pattison | 60/563 |
| 4,439,986 | 4/1984 | Snitgen | 60/547.1 |
| 4,455,828 | 6/1984 | Snitgen | 60/547.1 |
| 4,499,728 | 2/1985 | Therond | 60/570 |
| 4,593,606 | 6/1986 | Klatt et al. | 92/52 |
| 4,905,588 | 3/1990 | Hara | 100/232 |
| 4,961,317 | 10/1990 | Wolfbauer, III | 60/560 |
| 4,993,226 | 2/1991 | Dekok | 60/547.1 |
| 5,107,681 | 4/1992 | Wolfbauer, III | 60/547.1 |
| 5,143,429 | 9/1992 | Higashimata | 303/115 |
| 5,161,865 | 11/1992 | Higashimata | 303/115.2 |
| 5,218,821 | 6/1993 | Beneteau | 60/560 |
| 5,247,870 | 9/1993 | Brasca | 91/519 |
| 5,259,195 | 11/1993 | Pringle | 60/567 |
| 5,265,423 | 11/1983 | Glaser | 60/560 |
| 5,377,488 | 1/1995 | Malina | 60/560 |
| 5,381,661 | 1/1995 | Malina | 60/565 X |

OTHER PUBLICATIONS

Author: Frank Mangrem White—*Viscous Fluid Flow,* 1974, pp. 411–412, U.S., McGraw–Hill.

*Primary Examiner*—Hoang Nguyen

*Attorney, Agent, or Firm*—Emch, Schaffer, Schaub & Porcello Co.

[57] ABSTRACT

An oil intensifier cylinder having a hollow cylindrical body. An intensifier piston is slideably positioned in the body. An intensifier rod is connected to and extends from the intensifier piston. An outer reservoir piston is slideably positioned in the body in spaced relationship with the intensifier piston. An inner reservoir piston is slideably positioned in the outer reservoir piston. The inner reservoir piston includes a bore that is disposed to allow the intensifier rod to extend through the inner reservoir piston. An oil reservoir is positioned adjacent the inner and outer reservoir pistons. The oil reservoir is positioned on sides of the inner and outer reservoir pistons that are opposite the intensifier piston. A port is disposed on the end of the oil reservoir that is spaced from the inner and outer reservoir pistons. The port has a shape that slideably and sealingly receives the intensifier rod. A work rod is slideably positioned in the body. The work rod is disposed on the opposite side of the oil reservoir piston. The work rod extends from the body for engaging a work piece.

18 Claims, 5 Drawing Sheets

OIL INTENSIFIER CYLINDER

BACKGROUND OF THE INVENTION

The present invention is directed to an oil intensifier cylinder having a work rod. More particularly, the invention is directed to an oil intensifier cylinder having more than one advancement position for the work rod.

Oil intensifier cylinders are known in the art. Examples of such cylinders are disclosed in U.S. Pat. Nos. 3,426,530; 3,633,365; 3,875,365; 4,288,987; 4,300,351; 4,961,317; 4,993,226; 5,107,681; 5,218,821; 5,247,871; and 5,265,423.

It has been found that there is a need for an oil intensifier cylinder that advances a work rod to predetermined positions, including a high pressure spoke. The present invention provides an oil intensifier that meets this need.

SUMMARY OF THE INVENTION

The oil intensifier cylinder of the present invention includes a hollow cylindrical body. An intensifier piston is slideably positioned in the body. An intensifier rod is connected to and extends from the intensifier piston.

An outer reservoir piston is slideably positioned in the body in spaced relationship with the intensifier piston. An inner reservoir piston is slideably positioned in the outer reservoir piston. The inner reservoir piston includes a bore that is disposed to allow the intensifier rod to extend through the inner reservoir piston.

An oil reservoir is positioned adjacent the inner and outer reservoir pistons. The oil reservoir is positioned on sides of the inner and outer reservoir pistons that are opposite the intensifier piston. A port is disposed on the end of the oil reservoir that is spaced from the inner and outer reservoir pistons. The port has a shape that slideably and sealingly receives the intensifier rod.

A work rod is slideably positioned in the body. The work rod is disposed on the opposite side of the oil reservoir piston. The work rod extends from the body for engaging a work piece.

A primary object of the present invention is to provide an oil intensifier cylinder having a work rod that advances the rod through more than one advancement position.

An important object of the present invention is to provide an oil intensifier cylinder that provides rapid movement of the work rod.

Other objects and advantages of the invention will become apparent upon a review of the accompanying drawings and the following detailed description of the invention.

DETAILED DESCRIPTION OF THE PREFERRED EMBODIMENTS

Figure 1:
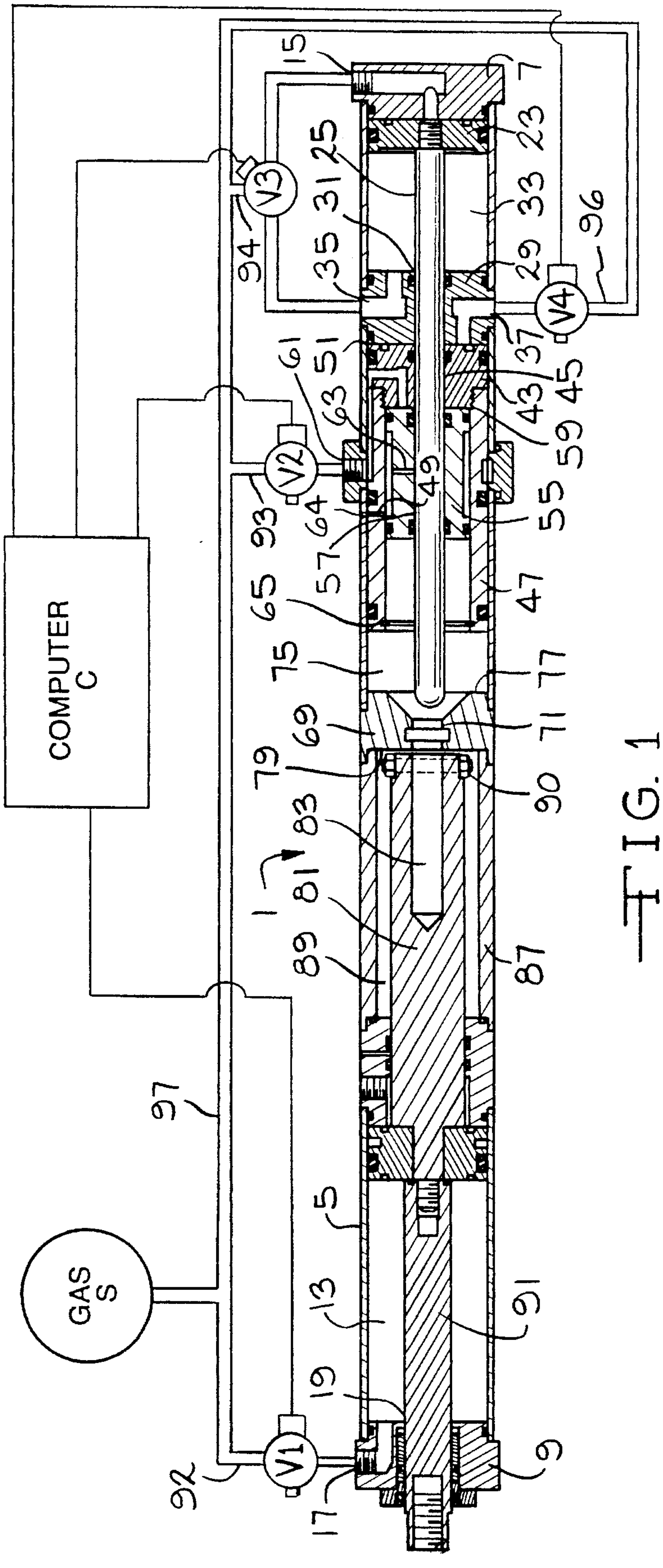
FIG. 1 is a detailed cross-sectional view through the center of a first embodiment of the oil intensifier cylinder according to the present invention.

The invention will now be described in detail with reference being made to the drawings. As shown in FIG. 1, the oil intensifier 1 of the present invention includes a cylindrical hollow outer body 5. A first manifold 7 is positioned on one end of the body 5 and a second manifold 9 is positioned on the opposite end of the body to form an enclosed chamber 13. The first manifold 7 has a port 15 that extends through the manifold and is in communication with the enclosed chamber 13. The second manifold 9 has a port 17 that extends through the manifold and is in communication with the enclosed chamber 13. A bore 19 extends through the center of the second manifold 9 and is also in communication with the enclosed chamber 13. Positioned in the interior of the body 5, adjacent the first manifold 7, is an intensifier piston 23. The intensifier piston 23 is disposed to be slideably positioned in the body 5. Connected to the intensifier piston 23 is an intensifier rod 25. The intensifier rod 25 extends in a direction that is substantially parallel to the longitudinal axis of the body 5. The intensifier rod 25 is also disposed so that it is substantially perpendicular to the intensifier piston 23.

Still referring to FIG. 1, an internal manifold 29 is positioned in the body 5 on the opposite side of the intensifier piston 23 from the first manifold 7. A bore 31 extends through the center of the internal manifold 29. The bore 31 is disposed for slideably receiving the intensifier rod 25 that extends from the intensifier piston 23. An intensifier chamber 33 is defined in the body 5 between the first manifold 7 and the internal manifold 29. The intensifier piston 23 is disposed to slideably move within the limits defined by the intensifier chamber 33. A first port 35 is located in the internal manifold 29 and extends from the exterior of the body 5 to the intensifier chamber 33. Positioned on the opposite side of the internal manifold 29 from the intensifier piston 23 is an outer reservoir piston 43. The outer reservoir piston 43 is slideably positioned in the body 5. A bore 45 extends through the outer reservoir piston 43. The bore 45 is disposed for slideably receiving the intensifier rod 25. Extending from the outer reservoir piston 43 is a hollow cylindrical skirt 47 that is slideably positioned in the body 5. The skirt 47 is securely attached to the outer reservoir piston 43 and moves with the outer reservoir piston. A skirt vent 49 extends through the wall of the skirt 47.

A fluid chamber 51 is disposed between the internal manifold 29 and the outer reservoir piston 43. A second port 37 in the internal manifold 29 places the fluid chamber 51 in communication with the exterior of the body 5.

As shown in FIG. 1, an inner reservoir piston 55 is slideably positioned in the skirt 47. The inner reservoir piston 55 contains a bore 57 that is disposed for slideably receiving the intensifier rod 25. An inner fluid chamber 59 is positioned between the inner reservoir piston 55 and the outer reservoir piston 43. A port 61 is positioned on the exterior of the body 5 and is in communication with the inner fluid chamber 59. An inner reservoir piston vent 63 extends through the wall of the inner reservoir piston 55. A body vent 64 extends through the body 5. The skirt vent 49 is in communication with the inner reservoir piston vent 63 that is in communication with the body vent 64. The vents 49, 63 and 64 cooperate to relieve air pressure that can be created between the inner reservoir piston 55 and the intensifier rod 25 and the skirt 47 by exhausting air through the body vent 64 to atmosphere. A stop member 65 is positioned on the end of the skirt 47 in spaced relationship with the outer reservoir piston 43. The stop member 65 and the outer reservoir piston 43 provide the limits for the slideable movement of the inner reservoir piston 55.

Still referring to FIG. 1, a valve block 69 is positioned in the body 5 in spaced relationship with the internal manifold 29. The valve block 69 is positioned on the opposite side of the outer reservoir piston 43 from the internal manifold 29. The valve block 69 has a valve seal 71 that is disposed for slideably receiving the intensifier rod 25. An oil reservoir 75 is formed in the body 5 between the valve block 69 and the inner reservoir piston 55. The valve seal 71 is configured so that it forms a seal with the intensifier rod 25 to prevent the flow of oil through the valve seal from the oil reservoir 75 when the intensifier rod 25 is positioned in the valve seal. The valve block 69 also forms a shoulder 77 that engages the skirt 47 to limit the travel of the outer reservoir piston 43.

As shown in FIG. 1, a work piston 81 is positioned in the enclosed chamber 13 of the body 5 on the side of the valve block 69 that is spaced from the outer reservoir piston 43. The work piston 81 is slideably positioned in the body 5 and has a cavity 83 that is in alignment with the valve seal 71. The cavity 83 is disposed for receiving oil from the oil reservoir 75. A guide block 87 is positioned in the enclosed chamber 13 of the body 5 to support the work piston 81. A slot 89 is positioned on opposite sides of the guide block 87. The slot 89 extends along the work piston 81. A tab 90 extends from each side of the work piston 81 to the slot 89. The tab 90 is slideably positioned in the slot 89 to prevent the work piston 81 from rotating while the work piston 81 advances along the guide block 87.

As shown in FIG. 1, the work piston 81 is connected to a work rod 91. The work rod 91 extends from the work piston 81 through the bore 19 in the second manifold 9 on the end of the body 5.

The diameter of the piston 81 is from about 25 to about 50 percent of the diameter of the outer reservoir piston 43. The exact percentage is dependent on the amount of force to be exerted by the work rod 91 on a workpiece.

Still referring to FIG. 1, each of the ports 17, 61, 35, 15 and 37 have connected thereto air pressure ducts 92, 93, 94 and 96 to and from pressure regulating valves V1, V2, V3 and V4, respectively. These ducts in turn are connected to a common supply duct 97 connected to an air pressure source, such as supply tank S.

There is provided a computer C schematically shown in FIG. 1 connected to each of the pressure regulating valves V1, V2, V3 and V4 to apply the same or different controlled pressures at predetermined times from the valves V1, V2, V3 and V4 to their respective ports. The computer C also controls the valves to exhaust air through their respective ports.

Figure 2:
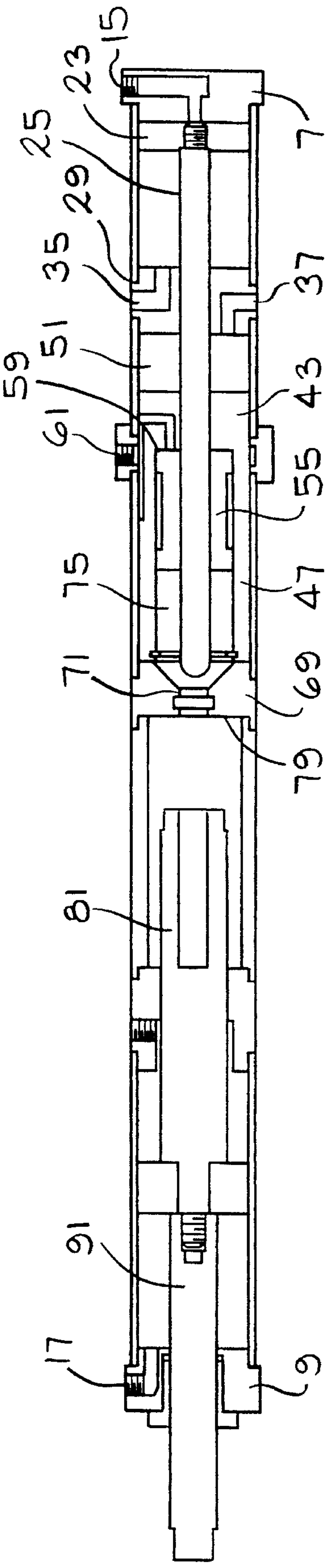
FIG. 2 is a simplified cross-sectional view similar to the view of FIG. 1 showing the cylinder in a first position.
Figure 3:
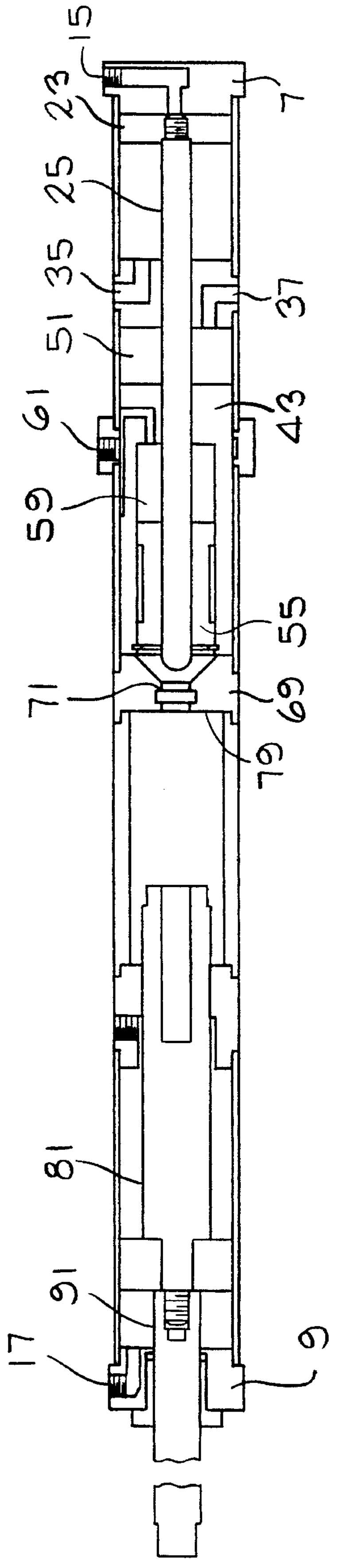
FIG. 3 is a view similar to the view of FIG. 2 showing the cylinder in a second position.
Figure 4:
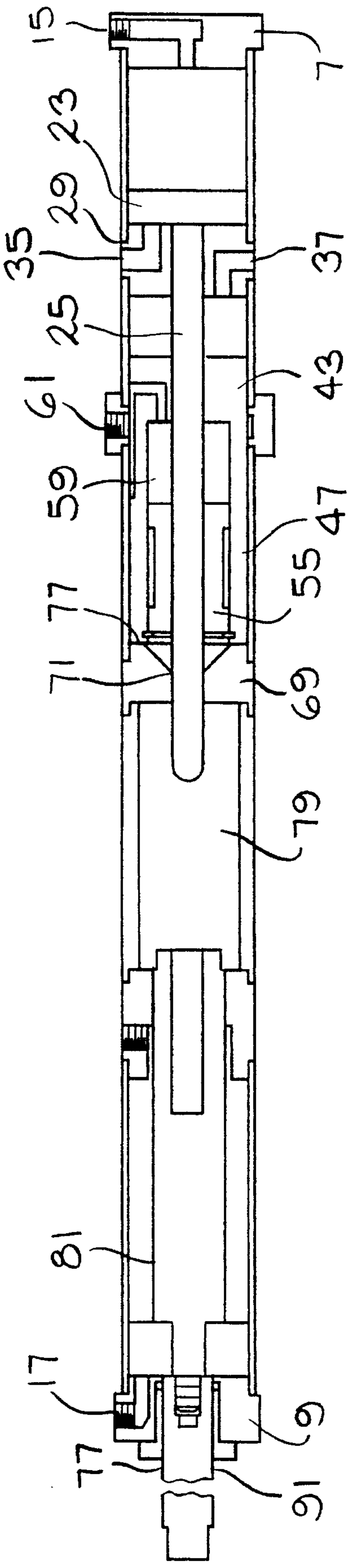
FIG. 4 is a view similar to the center of FIG. 2 showing the cylinder in a third position.

In operation the intensifier 1 of the present invention is designed to extend from the fully retracted position shown in FIG. 1 to an intermediate position shown in FIG. 2, to an advanced position shown in FIG. 3 and then to an intensified work stroke or high pressure stroke shown in FIG. 4. To begin the operation of the intensifier 1, air under pressure is applied to the first port 35 in the internal manifold 29 to maintain the intensifier piston 23 in position adjacent the first manifold 7. At the same time air under pressure is introduced to the second port 37 in the internal manifold 29. The air under pressure enters the fluid chamber 51 and causes the outer reservoir piston 43 to advance in a direction towards the valve block 69. The hollow cylindrical skirt 47, which is attached to the outer reservoir piston 43, also advances with the outer reservoir piston. The outer reservoir piston 43 is advanced until the skirt 47 engages the shoulder 77 formed by the valve block 69. The advancement of the outer reservoir piston 43 causes oil in the oil reservoir 75 to be displaced from the oil reservoir 75 through the valve seal 71 and into the work fluid chamber 79. The oil that is displaced from the oil reservoir 75 causes the work piston 81 and the work rod 91 to be advanced a predetermined distance to the intermediate position shown in FIG. 2.

Once the outer reservoir piston 43 has been fully advanced, air under pressure supplied to port 61 enters inner fluid chamber 59 causing the inner reservoir piston 55 to be advanced in a direction towards the valve block 69. The advancement of the inner reservoir piston 55 causes additional oil in the oil reservoir 75 to be displaced through the valve seal 71 into the work fluid chamber 79. This additional oil displacement causes the work piston 81 and the work rod 91 to advance to the work position shown in FIG. 3. During the advancement of the outer reservoir piston 43 and the inner reservoir piston 55, the port 17 in the second manifold 9 is opened so that air in the enclosed chamber 13 can be exhausted to allow the work piston 81 and work rod 91 to advance more freely towards the second manifold 9.

Once the work rod 91 is in the work position, as shown in FIG. 3, the high pressure intensifier stroke can be initiated to complete the work cycle. During the intensifier stroke, air under pressure is maintained at the second port 37 and the port 61 to maintain the outer reservoir piston 43 and inner reservoir piston 55, respectively, in fully extended positions. In addition, port 17 is opened so that air can be evacuated from the enclosed chamber 13 as the work piston 81 and work rod 91 advance towards the second manifold 9. To initiate the intensifier stroke, air under pressure is supplied to port 15 in the first manifold 7. Air in the internal manifold 29 is exhausted through port 35. This causes the intensifier piston 23 to be advanced in a direction towards the valve block 69. As the intensifier piston is advanced in this direction, the intensifier rod 25 is advanced so that it engages the valve seal 71 and effectively seals off the oil reservoir 75 from the work fluid chamber 79. The advancement of the intensifier rod 25 into the valve seal 71 causes a small advancement of the work piston 81 and the work rod 91 in a direction towards the second manifold 9.

After the intensifier stroke has been completed the intensifier piston 23 and intensifier rod 25 are returned to the position shown in FIG. 1 by venting port 15 in the first manifold 7 to atmosphere and supplying fluid under pressure to first port 35 in the internal manifold 29. The air under pressure from the first port 35 acts upon the intensifier piston to cause it to advance in a direction towards the first manifold 7. At this point, an additional intensifier stroke can be completed or the work rod 91 can be advanced back to the intermediate position or to the fully retracted position.

To return to the intermediate position, air under pressure is supplied to the port 17 in the second manifold 9. The port 61 in the body 5 is exhausted to atmosphere. The fluid under pressure entering through port 17 acts upon the work piston 81 to cause the work piston to be advanced towards the valve block 69. Advancement of the work piston 81 causes oil from the work fluid chamber 79 to be displaced through the valve seal 71 and returned to the oil reservoir 75. Oil that is advanced causes the inner reservoir piston 55 to be advanced towards the first manifold 7. Because air under pressure is still supplied to the second port 37 in the internal manifold 29, the outer reservoir piston 43 is maintained in position against the shoulder 77 defined by the valve block 69. Thus, the work rod 91 is advanced from the working position to the intermediate position. If it is desired to again advance the work rod 91 to the work position, the inner reservoir piston 55 can be advanced towards the valve block 69 in the manner previously described. Further, the intensifier stroke can also be initiated in the manner previously described.

If the work rod 91 is returned to the fully retracted position, it is only necessary to exhaust the second port 37 in the internal manifold 29 to atmosphere. This will allow the outer reservoir piston 43 to be advanced in a direction towards the internal manifold 29. Additional oil from the work fluid chamber 79 will be displaced through the valve seal port 71 into the oil reservoir 75 causing the outer reservoir piston 43 to be advanced until it is adjacent the internal manifold 29. Once the work rod 91 is returned to the fully retracted position, it can be advanced through the cycle in the manner previously described.

Figure 5:
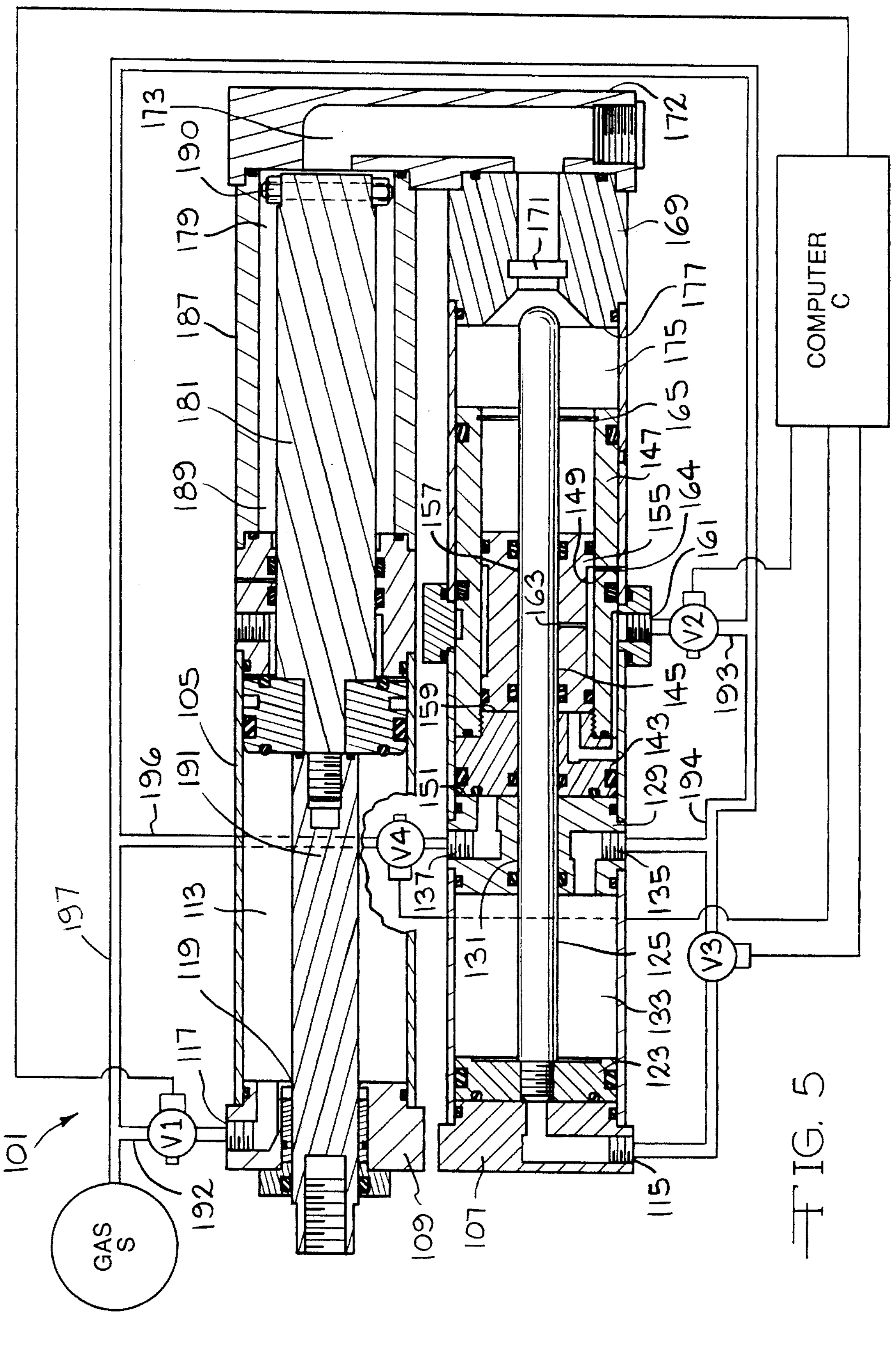
FIG. 5 is a detailed cross-sectional view through the center of a second embodiment of the oil intensifier cylinder according to the present invention.

A second embodiment of the present invention is shown in FIG. 5. In this embodiment, the oil intensifier 101 includes a cylindrical hollow outer body 105 in a generally "U-shaped" configuration. This embodiment is used in applications where there is limited space for placement of the intensifier 101 with respect to the work piece.

As shown in FIG. 5, the intensifier 101 includes a first manifold 107 positioned on one end of the body 105 and a second manifold 109 positioned on the opposite end of the body to form an enclosed chamber 113. The first manifold 107 has a port 115 that extends through the manifold and is in communication with the enclosed chamber 113. The second manifold 109 has a port 117 that extends through the manifold and is in communication with the enclosed chamber 113. A bore 119 extends through the center of the second manifold 109 and is also in communication with the enclosed chamber 113. Positioned in the interior of the body 105, adjacent the first manifold 107, is an intensifier piston 123. The intensifier piston 123 is disposed to be slideably positioned in the body 105. Connected to the intensifier piston 123 is an intensifier rod 125. The intensifier rod 125 extends substantially perpendicular to the intensifier piston 123. A skirt vent 149 extends through the wall of the skirt 147.

An internal manifold 129 is positioned in the body 105 on the opposite side of the intensifier piston 123 from the first manifold 107. A bore 131 extends through the center of the internal manifold 129 to slideably receive the intensifier rod 125. An intensifier chamber 133 is defined in the body 105 between the first manifold 107 and the internal manifold 129. The intensifier piston 123 is disposed to slideably move within the limits defined by the intensifier chamber 133. A first port 135 is located in the internal chamber 129 and extends from the exterior of the body 105 to the intensifier chamber 133. Positioned on the opposite side of the internal manifold 129 from the intensifier piston 123, is an outer reservoir piston 143. The outer reservoir piston 143 is slideably positioned in the body 105. A bore 145 extends through the outer reservoir piston 143. The bore 145 is disposed for slideably receiving the intensifier rod 125. Extending from the outer reservoir piston 143 is a hollow cylindrical skirt 147 that is slideably positioned in the body 105. The skirt 147 is securely attached to the outer reservoir piston 143 and moves with the outer reservoir piston.

A fluid chamber 151 is positioned between the internal manifold 129 and the outer reservoir piston 143. A second port 137 in the internal manifold 129 places the fluid chamber 151 in communication with the exterior of the body 105.

An inner reservoir piston 155 is slideably positioned in the skirt 147. The inner reservoir piston 155 contains a bore 157 that is disposed for slideably receiving the intensifier rod 125. An inner fluid chamber 159 is positioned between the inner reservoir piston 155 and the outer reservoir piston 143. A port 161 is positioned on the exterior of the body 105 and is in communication with the inner fluid chamber 159. An inner reservoir piston vent 163 extends through the wall of the inner reservoir piston 155. A body vent 164 extends through the body 105. The skirt vent 149 is in communication with the inner reservoir piston vent 163 that is in communication with the body vent 164. The vents 149, 163 and 164 cooperate to relieve air pressure that can be created between the inner reservoir piston 155 and the intensifier rod 125 and skirt 147 by exhausting air through the body vent 164 to atmosphere. A stop member 165 is positioned on the end of the skirt 147. The stop member 165 and the outer reservoir piston 143 provides the limits for the slideable movement of the inner reservoir piston 155.

A valve block 169 is positioned at the body 105 in a spaced relationship with the internal manifold 129. The valve block 169 is positioned on the opposite side of the outer reservoir piston 143 from the internal manifold 129. The valve block 169 has a valve seal 171 that is disposed for slideably receiving the intensifier rod 125. An oil reservoir 175 is formed in the body 105 between the valve block 169 and the inner reservoir piston 155. The valve seal 171 is configured so that it forms a seal with the intensifier rod 125 to prevent the flow of oil through the valve seal 171 from the oil reservoir 175 when the intensifier rod 125 is positioned in the valve seal 171. The valve block 169 also forms a shoulder 177 that engages the skirt 147 to limit the travel of the outer reservoir piston 143.

A connection manifold 172 is positioned on the side of the valve block 169 that is spaced from the outer reservoir piston 143. The connection manifold 172 includes a fluid passageway 173.

A work piston 181 is positioned in the body 105 in a parallel relationship with the intensifier rod 125. The work piston 181 is slideably positioned in the body 105. The work piston 181 is in communication with the oil reservoir 175 through the fluid passageway 173.

The work piston 181 and the manifold 172 define a work fluid chamber 179. A guide block 187 is positioned in the enclosed chamber 113 of the body 105 to support the work piston 181. A slot 189 is positioned on the opposite sides of the guide block 187. The slot 189 extends along the work piston 181. A tab 190 extends from each side of the work piston 181 to the slot 189. The tab 190 is slideably positioned in the slot 189 to prevent the work piston 181 from rotating while the work piston 181 advances along the guide block 187.

The work piston 181 is connected to a work rod 191. The work rod 191 extends from the work piston 181 through the bore 119 in the second manifold 109 on the end of the body 105.

The diameter of the piston 181 is from about 25 to about 50 percent of the diameter of the outer reservoir piston 143. The exact percentage is dependent on the amount of force to be exerted by the work rod 191 on a workpiece.

Still referring to FIG. 1, each of the ports 117, 161, 135, 115 and 137 have connected thereto air pressure ducts 192, 193, 194 and 196 to and from pressure regulating valves V1, V2, V3 and V4, respectively. These ducts in turn are connected to a common supply duct 197 connected to an air pressure source, such as supply tank S.

There is provided a computer C schematically shown in FIG. 5 connected to each of the pressure regulating valves V1, V2, V3 and V4 to apply the same or different controlled pressures at predetermined times from the valves V1, V2, V3 and V4 to their respective ports. The computer C also controls the valves to exhaust air through their respective ports.

The operation of the intensifier 101, as shown in FIG. 5, is generally the same as previously described for the first embodiment. The only difference is that oil from oil reservoir 175 is displaced through valve seal 171 into the fluid passageway 173 of the connecting manifold 172. The intensifier 101 can advance the work rod 191 through the various positions as described for the first embodiment intensifier 1.

Preferred embodiments of this invention having been described and illustrated in detail, it is to be understood that numerous modifications thereof may be made without departing from the broad spirit and scope of this invention, as defined in the appended claims.

I claim:

1. An oil intensifier cylinder comprising:

a body;

an intensifier piston slideably positioned in said body;

an intensifier rod connected to and extending from said intensifier piston;

an outer reservoir piston slideably positioned in said body in spaced relationship with said intensifier piston;

an inner reservoir piston slideably positioned in said outer reservoir piston, said inner reservoir piston containing a bore, said bore being disposed to allow said intensifier rod to extend through said inner reservoir piston;

an oil reservoir positioned adjacent said inner and outer reservoir pistons, said oil reservoir positioned on sides of said outer and inner reservoir pistons that are opposite said intensifier piston;

a port disposed on said end of said oil reservoir that is spaced from said outer and inner reservoir pistons, said port having a shape to slideably and sealingly receive said intensifier rod; and a work rod slideably positioned in said body, said work rod disposed on the opposite side of said oil reservoir piston, said work rod extending from said body for engaging a work piece, whereby movement of said outer reservoir piston displaces oil from said reservoir through said port to act upon and advance said work rod a predetermined distance, movement of said inner reservoir piston displacing oil from said reservoir to advance said work rod a second predetermined distance, movement of said intensifier piston causing said intensifier rod to move into said port to seal said reservoir from said work rod and to move said work rod a third predetermined distance at a high pressure.

2. The oil intensifier of claim 1, wherein said body is cylindrical.

3. The oil intensifier of claim 2, wherein said body is substantially straight.

4. The oil intensifier of claim 2, wherein said body is substantially U-shaped.

5. The oil intensifier of claim 4, wherein said intensifier includes a connection manifold having a fluid passageway.

6. The oil intensifier of claim 1, wherein said intensifier rod is substantially perpendicular to said intensifier piston.

7. The oil intensifier of claim 1, wherein a hollow cylindrical skirt extends from said reservoir piston, said skirt receiving said inner reservoir piston.

8. The oil intensifier of claim 7, wherein said hollow cylindrical skirt includes a stop member for limiting the movement of said inner reservoir piston.

9. The oil intensifier of claim 1, wherein said work rod piston has a diameter that is from about 25 to about 50 percent of the diameter of said reservoir piston.

10. An oil air intensifier cylinder comprising:

a body;

an intensifier piston slideably positioned in said body;

an intensifier rod connected to and extending from said intensifier piston;

an outer reservoir piston slideably positioned in said body, said reservoir piston being disposed in spaced relationship with said intensifier piston, a bore extending through said outer reservoir piston, said bore being disposed to allow said intensifier rod to extend through said outer reservoir piston;

an inner reservoir piston slideably positioned in said outer reservoir piston, said inner reservoir piston having a bore, said bore being disposed to allow said intensifier rod to extend through said inner reservoir piston;

an oil reservoir positioned adjacent said outer and inner reservoir pistons, said oil reservoir positioned on sides of said outer and inner reservoir pistons that are opposite said intensifier piston;

a port disposed on said end of said oil reservoir that is spaced from said outer and inner and outer reservoir pistons, said port having a shape to slideably and sealingly receive said intensifier rod;

a work rod piston slideably positioned in said body, said work rod piston positioned on the side of said reservoir port that is spaced from said reservoir piston;

a work rod connected to said work rod piston, said work rod, extending from said body and being disposed to move with said work rod piston;

a source of air under pressure to cause said outer reservoir piston to advance into said oil reservoir to advance oil from said reservoir through said port to cause said work rod piston to advance a predetermined distance;

a source of air under pressure to cause said inner reservoir piston to advance into said oil reservoir to advance oil from said reservoir through said port to cause said work rod piston to advance a predetermined distance; and a source of air under pressure to cause said intensifier piston to advance whereby said intensifier rod engages and seals said port in said oil reservoir, said intensifier rod displacing said oil acting on said work rod piston to cause said work rod piston to advance a predetermined distance at high pressure.

11. The oil intensifier of claim 10, wherein said body is cylindrical.

12. The oil intensifier of claim 11, wherein said body is substantially straight.

13. The oil intensifier of claim 11, wherein said body is substantially U-shaped.

14. The oil intensifier of claim 13, wherein said intensifier includes a connection manifold having a fluid passageway.

15. The oil intensifier of claim 10, wherein said intensifier rod is substantially perpendicular to said intensifier piston.

16. The oil intensifier of claim 10, wherein a hollow cylindrical skirt extends from said reservoir piston, said skirt receiving said inner reservoir piston.

17. The oil intensifier of claim 16, wherein said hollow cylindrical skirt includes a stop member for limiting the movement of said inner reservoir piston.

18. The oil intensifier of claim 10, wherein said work rod piston has a diameter that is from about 25 to about 50 percent of the diameter of said reservoir piston.

* * * * *